US012303770B2

(12) United States Patent
Miette

(10) Patent No.: US 12,303,770 B2
(45) Date of Patent: May 20, 2025

(54) SKI CORE AND SKI INCLUDING SUCH A CORE

(71) Applicant: SALOMON S.A.S., Epagny Metz-Tessy (FR)

(72) Inventor: Philippe Miette, Annecy le Vieux (FR)

(73) Assignee: SALOMON S.A.S., Epagny Metz-Tessy (FR)

( * ) Notice: Subject to any disclaimer, the term of this patent is extended or adjusted under 35 U.S.C. 154(b) by 330 days.

(21) Appl. No.: 17/979,461

(22) Filed: Nov. 2, 2022

(65) Prior Publication Data

US 2023/0136845 A1    May 4, 2023

(30) Foreign Application Priority Data

Nov. 3, 2021   (FR) ........................................ 2111643
Jun. 20, 2022  (FR) ........................................ 2206009

(51) Int. Cl.
| | |
|---|---|
| *A63C 5/12* | (2006.01) |
| *A63C 5/04* | (2006.01) |
| *A63C 5/048* | (2006.01) |
| *B32B 1/00* | (2006.01) |
| *B32B 3/30* | (2006.01) |
| *B32B 27/08* | (2006.01) |

(Continued)

(52) U.S. Cl.
CPC ............ *A63C 5/126* (2013.01); *A63C 5/0434* (2013.01); *A63C 5/048* (2013.01); *B32B 1/00* (2013.01); *B32B 3/30* (2013.01); *B32B 27/08* (2013.01); *B32B 27/36* (2013.01); *B32B 27/40* (2013.01); *A63C 5/044* (2013.01)

(58) Field of Classification Search
CPC ....... A63C 5/126; A63C 5/0434; A63C 5/048; A63C 5/044; A63C 5/03; A63C 5/12; B32B 1/00; B32B 3/30; B32B 27/08; B32B 27/36; B32B 27/40
See application file for complete search history.

(56) References Cited

U.S. PATENT DOCUMENTS

| | | | | |
|---|---|---|---|---|
| 4,875,702 A | * | 10/1989 | Scherubl ................ | A63C 5/122 280/610 |
| 5,848,800 A | * | 12/1998 | Metzler .................... | A63C 5/12 280/610 |

FOREIGN PATENT DOCUMENTS

| | | | | |
|---|---|---|---|---|
| DE | 3417540 A | * | 12/1984 | ............... A63C 5/12 |
| DE | 19502039 A1 | * | 7/1996 | ............... A63C 5/12 |

(Continued)

OTHER PUBLICATIONS

WO-2004060503-A1 English Translation (Year: 2004).*

(Continued)

*Primary Examiner* — James A Shriver, II
*Assistant Examiner* — Michael T. Walsh
(74) *Attorney, Agent, or Firm* — GREENBLUM & BERNSTEIN, P.L.C.

(57) ABSTRACT

A ski having a core that includes a left lateral edge, a right lateral edge, and at least one central inner core positioned between the two lateral edges. The core also includes a plurality of left wings arranged between at least one central inner core and the left lateral edge, each left wing forming an angle between 5° and 85° or between 95° and 175° with the longitudinal axis X, and a plurality of right wings arranged between at least one central inner core and the right lateral edge, each right wing forming an angle between 5° and 85° or between 95° and 175° with the longitudinal axis X.

15 Claims, 15 Drawing Sheets

(51) Int. Cl.
*B32B 27/36* (2006.01)
*B32B 27/40* (2006.01)
*A63C 5/044* (2006.01)

(56) References Cited

FOREIGN PATENT DOCUMENTS

| | | |
|---|---|---|
| EP | 2 745 884 A1 | 6/2014 |
| FR | 3 058 899 A1 | 5/2018 |
| WO | 03/008052 A1 | 1/2003 |
| WO | WO-2004060503 A1 * | 7/2004 ............... A63C 5/12 |

OTHER PUBLICATIONS

DE-3417540-A English Translation (Year: 1984).*
DE-19502039-A1 English Translation (Year: 1996).*
Search Report and Written Opinion, dated Jul. 13, 2022, in family member application No. FR 2111643.

* cited by examiner

SKI CORE AND SKI INCLUDING SUCH A CORE

CROSS-REFERENCE TO RELATED APPLICATION

This application is based upon French Patent Applications Nos. FR 21 11643, filed Nov. 3, 2021, and FR 22 06009, filed Jun. 20, 2022, the disclosures of which are hereby incorporated by reference thereto in their entirety, and the priorities of which are claimed under 35 U.S.C. § 119.

BACKGROUND

1. Field of the Invention

The present invention relates to the manufacture of skis, in particular the manufacture of cross-country skis. Skis are generally comprised of a composite structure in which two longitudinal structural elements (an upper reinforcement and a lower reinforcement) are spaced apart from one another by an intermediate element, referred to as the core. The present invention is particularly aimed at improving the construction of the core.

2. Background Information

The ski weight is always an important factor when evaluating a ski. This is even more the case for specific practices, such as cross-country skiing or even ski touring. Indeed, during these practices, the user must move forward on skis without being able to benefit from gravity, but quite the contrary. Therefore, achieving lightness is a constant objective for ski designers and manufacturers.

Naturally, aiming to achieve lightness should not be to the detriment of the mechanical characteristics of the ski, in particular its stiffness, and finding the best compromise is a constant objective.

Document EP 2745884 describes a ski intended for ski touring, which the manufacturer has sought to make as lightweight as possible, and it uses two means to this end. Firstly, the outer shape of the ski is selected to optimize the use of the material. For this purpose, all the ski portions that are not used for the ski bindings have a convex profile. Secondly, recesses in the form of longitudinal grooves are made in the lower central portion of the core. In document EP 2745884, the grooves, being longitudinal, are relatively easy and inexpensive to make, for example by milling. However, the weight reduction that they enable is limited. In the present case, according to a transverse section of the ski, only about 25% of the width of the core is affected by the weight reduction due to the ribs. It is in fact difficult to exceed this value without risk of weakening the resistance to crushing in the transverse direction of the core. Given the fact that the ribs cannot be through and that a minimum core thickness is required on the ribs to guarantee sufficient rigidity of the core, the final weight reduction obtained cannot exceed 17%.

SUMMARY

An object of the invention is to construct a ski which, although lighter compared to equivalent skis, retains the same mechanical characteristics, in particular dynamic behavior, and equal bending and torsional stiffness.

That object of the invention is achieved by providing a ski comprising a core comprising a left lateral edge, a right lateral edge and, at least one central inner core positioned between the two lateral edges, the lateral edges and the at least one central inner core extending along a longitudinal axis substantially parallel to the longitudinal axis of the ski. A longitudinal axis "substantially" parallel to the longitudinal axis of the ski can be interpreted as having an orientation of +/−25°. The core of the ski comprises:

a plurality of left wings arranged between at least one central inner core and the left lateral edge, each left wing forming an angle between 5° and 85° or between 95° and 175° with the longitudinal axis of the ski, and a plurality of right wings arranged between at least one central inner core and the right lateral edge, each right wing forming an angle between 5° and 85° or between 95° and 175° with the longitudinal axis of the ski.

In one embodiment of the invention, the ski, in its thickness, is comprised of five successive elements starting from the ground, namely, a gliding sole, a lower reinforcement, the core, an upper reinforcement and a top layer, at least the left and right lateral edges extending over the entire height of the core.

In one embodiment of the invention, the height of the core is always at least equal to 50%, of the height of the ski in the recessed zone of the core.

In one embodiment of the invention, the core comprises a horizontal upper plate, the left lateral edge and the right lateral edge both extending downwards from the left and right lateral edges, respectively, of the upper plate.

In one embodiment of the invention, the core comprises a plurality of recesses, each recess being demarcated by two adjacent wings, each recess being blind or extending through the entire height of the core.

In one embodiment of the invention, the core is comprised of two components assembled to one another, one of these components carrying the left and right lateral edges. Preferably, one of the components of the core is a plate for closing the recesses. Preferably, the plate carries the central inner core(s) and/or the wings.

In one embodiment of the invention, the left wings and right wings are arranged symmetrically with respect to the longitudinal axis of the ski.

In one embodiment of the invention, in a front portion of the core, the left wings form an angle between 5° and 85° with the longitudinal axis of the ski, and the right wings form an angle between 95° and 175° with the longitudinal axis of the ski, and, in a rear portion of the core, the left wings form an angle between 95° and 175° with the longitudinal axis of the ski, and the right wings form an angle between 5° and 85° with the longitudinal axis of the ski, or vice versa.

In one embodiment of the invention, the core is produced by injection.

In one embodiment of the invention, the core is made of a PU foam.

In one embodiment of the invention, the wings are arranged so that their width is substantially equal to the space separating two adjacent wings. Such width being "substantially" equal to the space can be interpreted as a dimension of +/−20%.

In one embodiment of the invention, the respective base of the left lateral edge, right lateral edge, central inner core, left and right wings, has a respective width $L_{42G}$, $L_{42D}$, $L_{44}$, $L_{46G}$ and $L_{46D}$, which is substantially equal and between two and eight millimeters. Such width being "substantially" equal and between two and eight millimeters can be interpreted as a dimension of +/−20%.

In one embodiment of the invention, the left wings and right wings, respectively, of the core do not all form the same angle with the longitudinal axis of the ski.

In one embodiment of the invention, the core comprises two central inner cores.

BRIEF DESCRIPTION OF DRAWINGS

The objects, characteristics, and advantages of the invention will be better understood from the detailed description that follows, with reference to the annexed drawings illustrating, by way of non-limiting embodiments, how the invention can be carried out, and in which.

DETAILED DESCRIPTION

The following detailed description makes use of terms such as "horizontal"", "vertical", "transverse", "upper", "lower", "lateral", "top", "bottom", "right", "left", "forward", "rearward", "front", "back". These terms should be considered as relative terms in relation to the normal position of the ski when used by the skier on a substantially flat track.

Also used is a reference point whose back/front direction corresponds to the X-axis, transverse or right/left direction corresponds to the Y-axis, and vertical or bottom/top direction corresponds to the Z-axis.

Subsequently, reference will be made to an angular orientation with respect to the longitudinal axis X of the ski. This angle is measured to qualify the orientation of an element with respect to the longitudinal axis X of the ski in absolute value. Thus, the angle is measured along a trigonometric or anti-trigonometric direction as a function of the location of the element in relation to the longitudinal axis X of the ski in order to always have a positive value, between 0 and 180°.

Figure 1:
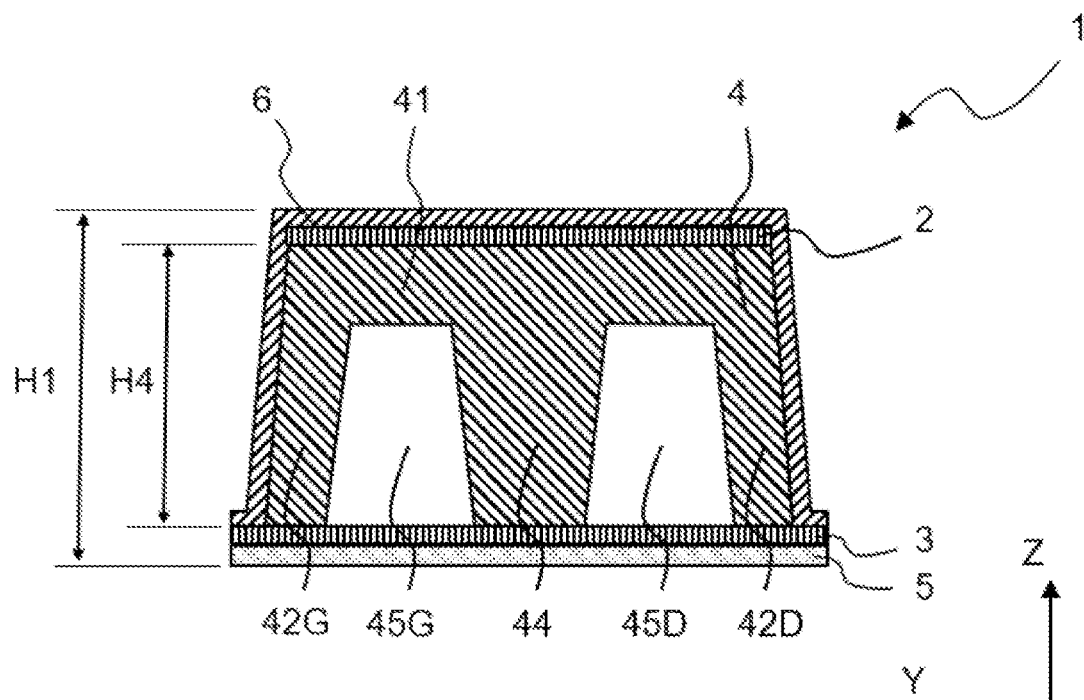
FIG. 1 is a "transverse" cross-sectional view of a ski.

FIG. 1 shows a transverse cross-sectional view of a ski 1 equipped with a core according to the invention. Conventionally, the ski is comprised of a composite mechanical structure comprising an upper reinforcement 2 and a lower reinforcement 3 that are spaced apart from one another by the core 4. Thus, the core is provided to be inserted between the upper reinforcement and the lower reinforcement. A gliding sole 5 is positioned under the lower reinforcement 3, and a top layer 6 covers the core 4 and the upper reinforcement 2. According to one embodiment, the upper reinforcement 2 and/or the lower reinforcement 3 can comprise a plurality of thin layers, these layers being markedly thinner than the thickness of the core.

The core 4 according to the invention comprises a left lateral edge 42G, a right lateral edge 42D, and a central inner core 44 positioned between the two lateral edges 42G, 42D. The top layer 6 is applied to the outer surfaces of the lateral edges. Recesses 45G, 45D are provided between the central inner core 44 and the lateral edges 42G, 42D and are separated from one another longitudinally by wings 46G, 46D. In other words, each left recess 45G is demarcated by the central inner core 44, the left lateral edge 42G and two successive left wings 46G. Similarly, each right recess 45D is demarcated by the central inner core 44, the right lateral edge 42D and two successive right wings 46D.

According to a first embodiment, the core comprises a horizontal upper plate 41. The left lateral edge 42G and the right lateral edge 42D extend downwards, in the direction of the lower reinforcement 3, from the left lateral edge and the right lateral edge, respectively, of the upper plate. The two lateral edges 42G, 42D are essentially vertical. In practice, their outer surface is slightly inclined and forms an angle of a few degrees with the vertical. The top layer 6 is applied to the outer surfaces of the lateral edges. In an alternative version, the top layer only covers the upper surface of the core and, thus, does not cover the lateral edges. The central inner core 44 is positioned between the two lateral edges 42G, 42D. Also extending from the upper plate 41, the inner core extends downwards, in the direction of the lower reinforcement 3, until it comes into contact therewith. Recesses 45G, 45D are provided between the central inner core 44 and the lateral edges 42G, 42D, and are separated from one another longitudinally by wings 46G, 46D.

Figure 2:
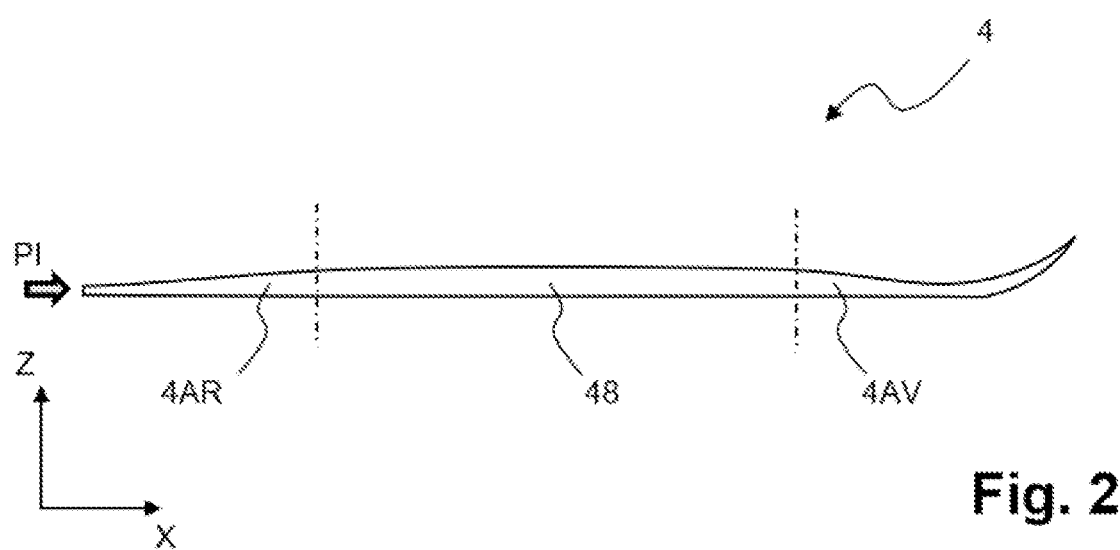
FIG. 2 is a side view of a core according to the invention.

FIG. 2 shows a side view of the core 4. Having a length between 140 cm and 180 cm (for a ski having a length between 170 cm and 210 cm), the core has a thickness which varies between a few millimeters at the ends (1 mm-2 mm) and a few centimeters in the central area (2 cm-3 cm). The side view shows the longitudinal extent of the central zone 48 where the recesses 45G, 45D are provided. The noted zone is demarcated by the dotted line. The recesses are arranged over the major portion (60%-70%) of this central portion 48 of the core. Preferably, no recess is provided neither in the front zone 4AV, nor in the rear zone 4AR of the core 4. The height of the recesses 45G, 45D is variable along the length of the core. Preferably, this height varies with the thickness curve of the core along the latter, so that the thickness "$L_{41}$" of the upper plate remains substantially constant over the entire length of the core. In practice, the thickness "$L_{41}$" is between two and eight millimeters. In the embodiment shown here, the thickness "$L_{41}$" is equal to four millimeters. In an alternative version where the recesses 45G, 45D are all through recesses, this height follows the thickness curve of the core.

In the central zone 48 of the core, i.e., the recessed zone of the core, the thickness H4 of the core 4 is always at least equal to 50% of the height H1 of the ski 1.

In the first embodiment described in FIGS. 1 to 4, the recesses 45G, 45D are not through recesses and the upper plate 41 is solid. Nevertheless, all or part of the recesses can be envisioned to be through recesses over the entire height of the core and, therefore, to extend through the upper plate. These examples, such as the embodiments shown in FIGS. 9 to 13, for example, are illustrated below.

Figure 3:
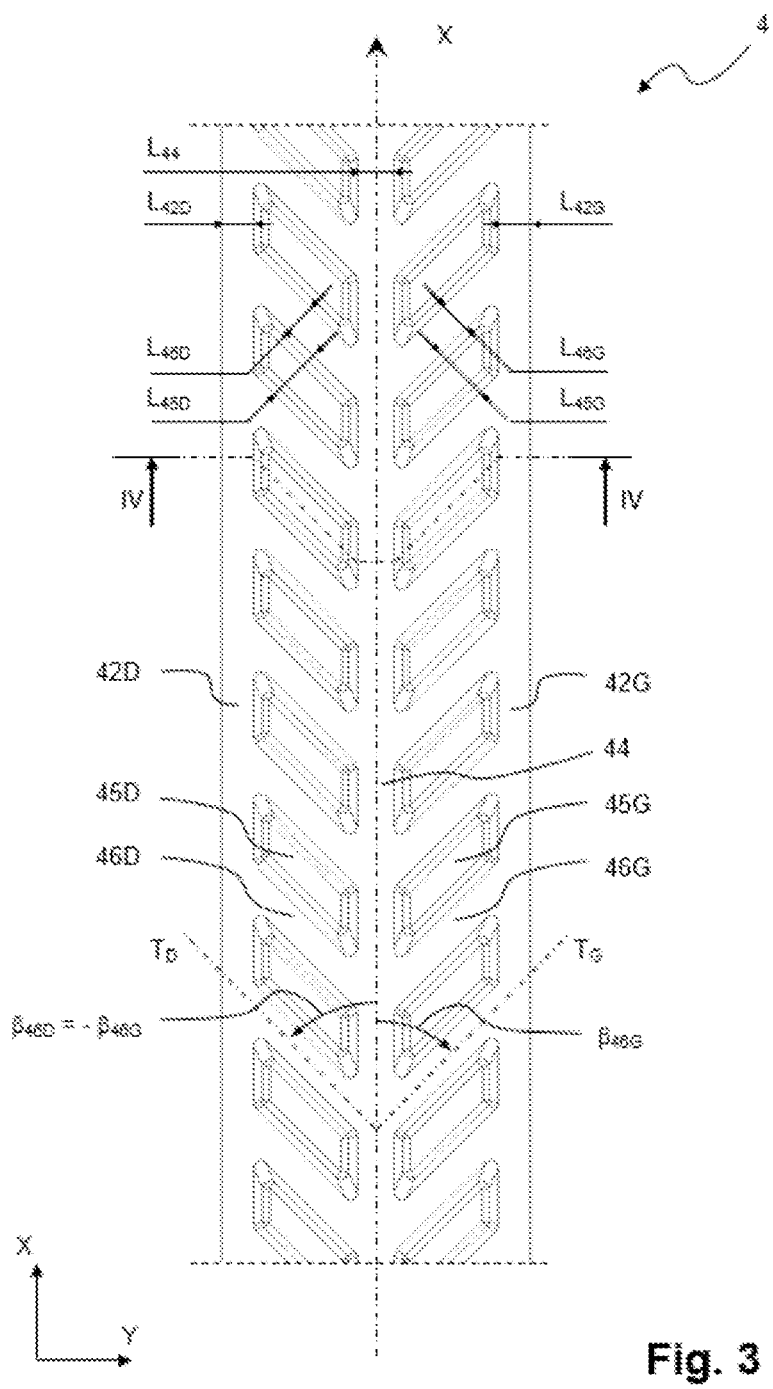
FIG. 3 is a bottom view of a core according to a first embodiment of the invention.

FIG. 3 shows a bottom view of the central portion 48 of the core according to the first embodiment of the invention, in which the left lateral edge 42G, the right lateral edge 42D and the central inner core 44 can be seen. All three are oriented along the longitudinal axis "X" of the core. The left lateral edge 42G and the right lateral edge 42D are connected to the central inner core by left wings 46G and right wings 46D, respectively. A left recess 45G and a right recess 45D are provided between two adjacent left wings 46G and two adjacent right wings 46D, respectively. The base of each of the recesses has the shape of a parallelogram. The top of the recesses also has the shape of a parallelogram whose dimensions are slightly less because the respective walls of the wings, the central inner core, the left lateral edge and the right lateral edge are not strictly vertical, but have an angle of a few degrees, the role of which is shown below.

The left wings 46G are all oriented along a direction $T_G$ which forms an angle $\beta_{46G}$ with the longitudinal axis X of the ski. Symmetrically, the right wings 46D are all oriented along a direction $T_D$ which forms an angle $\beta_{46D}$ with the longitudinal axis X of the ski. Thus, the angles $\beta_{46G}$ and $\beta_{46D}$ in are equal in value but opposite with respect to the longitudinal axis X of the ski. These angles $\beta_{46G}$ and $\beta_{46D}$ must be different from the right angle (90°), or at least not be close thereto. An angle $\beta_{46G}$, $\beta_{46D}$ between 5° and 85° may be selected. Preferably, a value between 30° and 60° will be selected. In the first embodiment of the invention, the angle $\beta_{46G}$, $\beta_{46D}$ is substantially equal to 45°.

The width "$L_{42G}$" of the left lateral edge 42G, the width "$L_{42D}$" of the right lateral edge, the width of the central inner core "$L_{44}$", and the width "$L_{46G}$, $L_{46D}$" of the wings have values between two and eight millimeters. It should be noted that these are width measurements taken at the base of these various elements along a transverse direction perpendicular to their greatest length. For the left and right wings, the measurement is taken along a direction perpendicular to the direction $T_G$, $T_D$, respectively. In the present case, the widths "$L_{42G}$", "$L_{42D}$", "$L_{44}$" and "$L_{46G}$, $L_{46D}$" are substantially equal to four millimeters.

The core 4 is preferably entirely made by injection of PU foam. A PU having a density between 250 and 300 kg/m³ is selected. For the ski having a length of 2100 mm of the first embodiment, the core 4, the length of which is 1900 mm, has a mass of 217 g. This mass is to be compared to the mass of a solid core, i.e., without recess, having the same external dimensions (length, width, thickness curve) and made of the same material, which is 297 g. Thus, the particular geometry of the core of the invention allows a weight savings of 27% compared to the prior art. Based on the total weight of the ski, this represents a weight savings of approximately 12%. Of course, other materials and other embodiments are possible within the scope of the invention, such as machining or even 3D printing, for example.

The distance "$L_{45G}$, $L_{45D}$" between two adjacent wings, measured at the base of the wings, is between two and ten millimeters. In this case "$L_{45G}$, $L_{45D}$" has a value of about seven millimeters. This distance corresponds to the width of a recess 45G, 45D. This is a preferential value in that it optimizes the weight savings of the core while limiting the loss of its rigidity.

Figure 4:
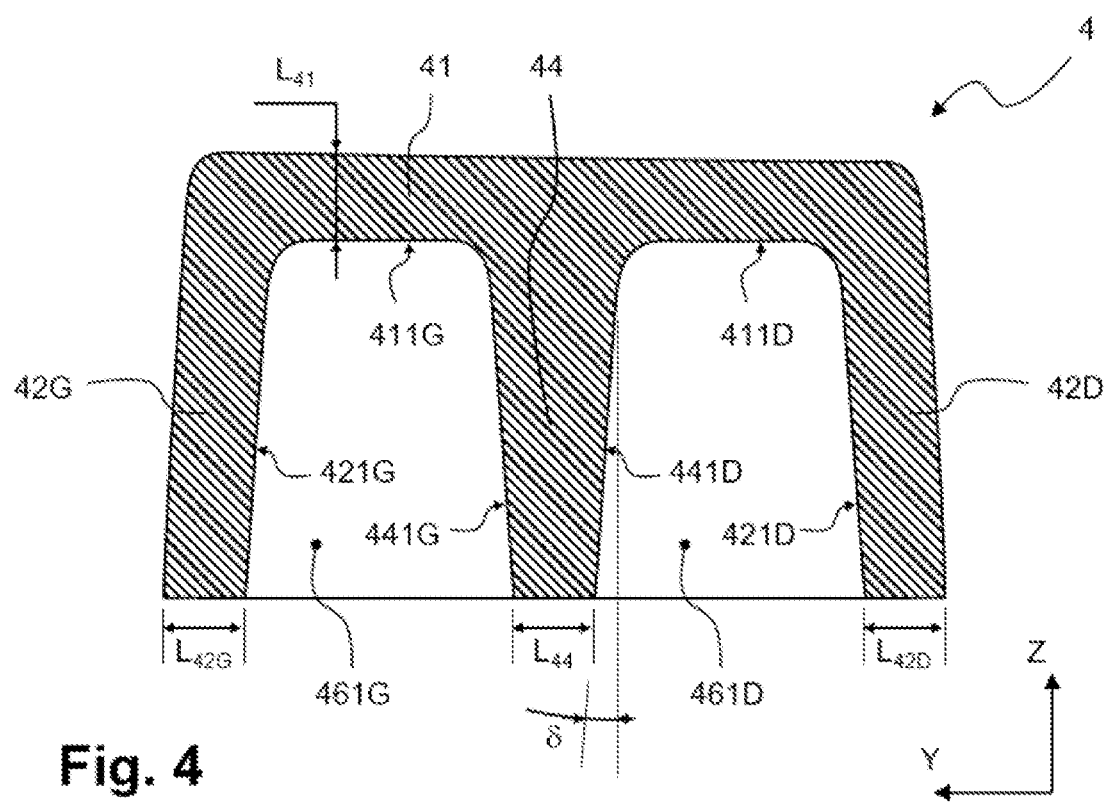
FIG. 4 is a cross-sectional view of the core along the line IV-IV of FIG. 3.

FIG. 4 is the cross-sectional view of the core along the line IV-IV. It should also be noted that this cross-sectional view is not made along a single plane but by along a succession of planes, which is materialized by the line IV-IV in FIG. 3. The shape of the recesses 45G, 45D is essentially that of a truncated pyramid whose base would be a parallelogram. Indeed, these recesses 45G, 45D have vertical walls 421G, 421D, 441G, 441D, 461G and 461D leaning against the left lateral flank 42G, the right lateral flank 42D, the central inner core 44, the left wings 46G, and the right wings 46D, respectively, and form an angle "δ" with the vertical axis Z. This angle is between 2° and 10° and preferably equal to 4°.

The particular geometry of the core according to the invention makes it possible to optimize the manufacture of a ski. Indeed, the core not only is lightweight, while guaranteeing excellent rigidity, but also easier to produce by injection. The many recesses lighten the core, and the wings act as structural ribs that prevent the lateral edges from coming closer to the central inner core. During injection manufacture of the core, the inclination of the wings facilitates the flow of the material and, thus, the uniform filling up of the mold. This improvement is particularly significant when injecting the core from an injection point PI positioned at one end (front or rear) of the core. It is found that the injection is carried out better when the inclination $\beta_{46G}$, $\beta_{46D}$ of the wings is between 30° and 60°. The dimensioning of the wings, the central inner core and the edges having a substantially constant thickness also contributes to improving injection. The inclination δ of the walls demarcating the recesses enables a solution by injection with simple mold matrices due to this clearance.

The other embodiments described below are variations in the geometry of the core. Everything that has been described concerning the materials used and the manufacture also applies to the following embodiments. They all thus enable optimization of the manufacture of a ski for the reasons explained above.

Figure 5:
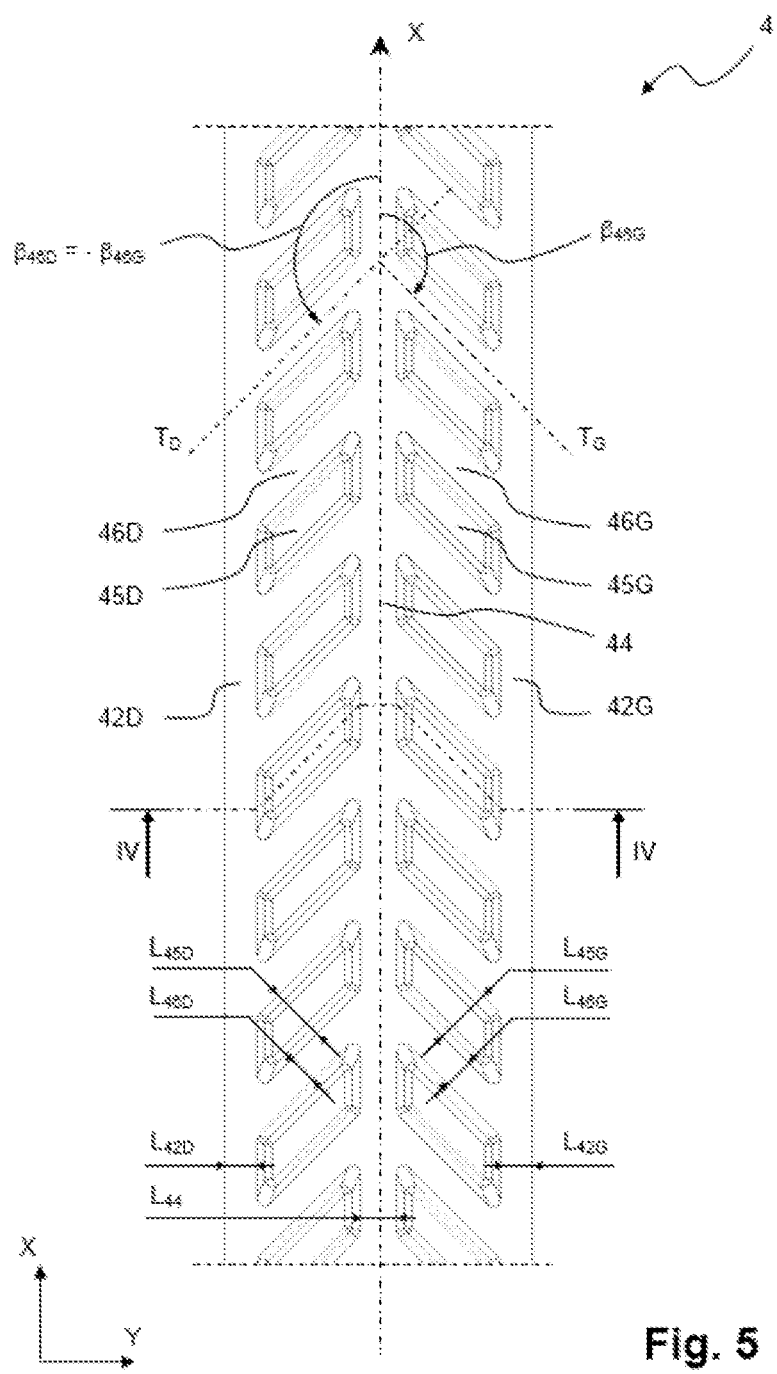
FIG. 5 is a bottom view of a core according to a second embodiment of the invention.

FIG. 5 shows a bottom view of a core 4 according to a second embodiment of the invention that is very close to the first embodiment. Here, only the inclination of the wings 46G, 46D differs. Thus, the angle $\mu_{46G}$, $\beta_{46D}$ is between 95° and 175°. Preferably, a value between 120° and 150° will be selected. In this example, the angle $\beta_{46G}$, $\beta_{46D}$ is substantially equal to 135°. The other features and benefits are similar to those of the first embodiment.

Figure 6:
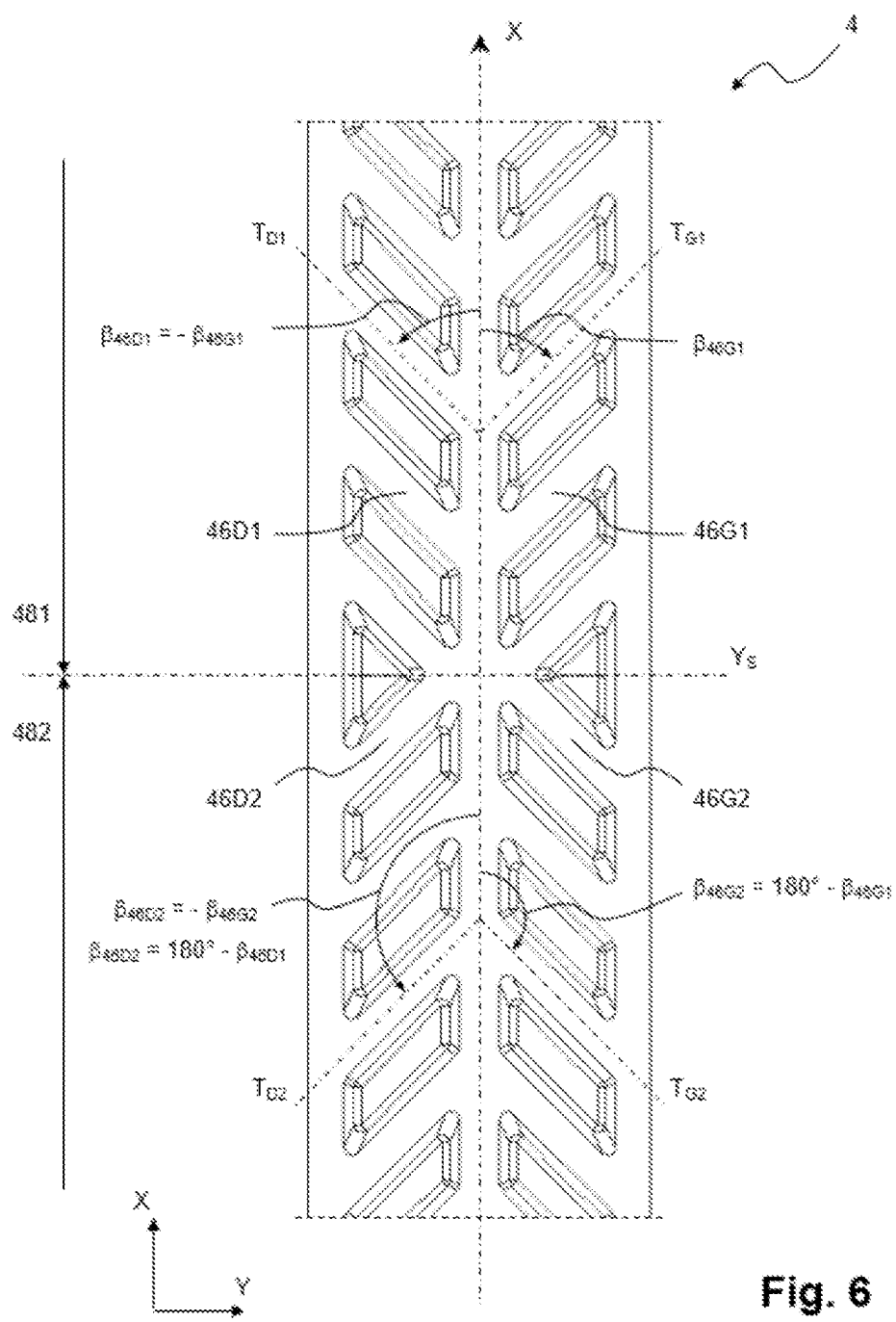
FIG. 6 is a bottom view of a core according to a third embodiment of the invention.

FIG. 6 shows a bottom view of a core 4 according to a third embodiment of the invention. This is a partial view in which only the central portion is shown. Many features of this third embodiment are identical to those of the first embodiment and will not be described herein again. These include the respective thicknesses of the lateral edges, the central inner core, the wings, and the upper plate.

One of the characteristics of this embodiment resides in the fact that the core 4 has a front portion 481 and a rear portion 482, separated from one another in the area of a transverse axis "$Y_S$". The axis $Y_S$ constitutes an axis of symmetry for the arrangement of the wings and of the recesses which separate them from one another. In the front portion 481 of the core 4, the left wings 46G1 form an angle $\beta_{46G1}$ with the longitudinal axis X of the ski, while the right wings 46D1 form an angle $\beta_{46D1}$ with the same longitudinal axis X of the ski. These angles $\beta_{46G1}$ and $\beta_{46D1}$ are between 5° and 85°, preferably between 30° and 60°. In this example, the left wings 46G1 and the right wings 46D1 are arranged symmetrically with respect to the longitudinal axis X of the ski. Thus, the angle $\beta_{46G1}$ is equal to the angle $\beta_{46D1}$. In the rear portion 482, however, the left wings 46G2 form an angle $\beta_{46G2}$ complementary to the angle $\beta_{46G1}$, that is to say, having a value equal to $180°-\beta_{46G1}$, and the right wings 46D2 form an angle $\beta_{46D2}$ complementary to the angle $\beta_{46D1}$, that is to say, of a value equal to $180°-\beta_{46D1}$. These angles $\beta_{46G2}$ and $\beta_{46D2}$ are between 95° and 175°, preferably between 120° and 150°. In this example, the left wings 46G2 and the right wings 46D2 are arranged symmetrically with respect to the longitudinal axis X of the ski. Thus, the angle $\beta_{46G2}$ is equal to the angle $\beta_{46D2}$. In the second embodiment shown in FIG. 6, the angles $\beta_{46G1}$ and $\beta_{46D1}$ are equal to 45° and the angles $\beta_{46G2}$ and $\beta_{46D2}$ are equal to 135°. It should be noted that the left wings 46G2 and the right wings 46D2 of the rear portion 482 are arranged in symmetry with the left wings 46G1 and the right wings 46D1, respectively, of the front portion 481 with respect to the transverse axis $Y_S$.

Preferably, the axis of symmetry $Y_S$ is substantially positioned longitudinally at a right angle to the metatarsal zone of a cross-country boot in engagement with a binding affixed to the ski, when the skier is in support phase on the ski. Indeed, such a positioning ensures better distribution of the thrust forces and, therefore, better propulsion. A better balance of movement of the skis is achieved.

Figure 7:
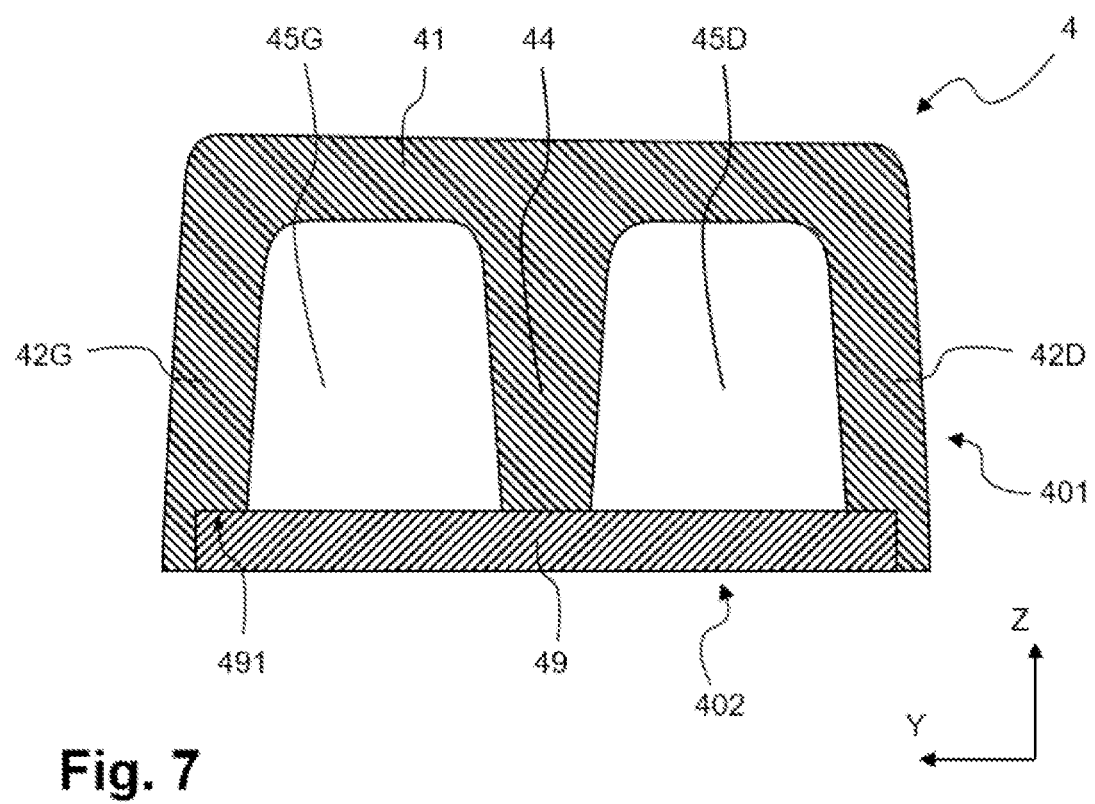
FIG. 7 is a cross-sectional view, similar to the cross-section of FIG. 4, of a core according to a fourth embodiment of the invention.

FIG. 7 is a transverse cross-sectional view of a core 4 according to a fourth embodiment of the invention. The core in this embodiment is comprised of two portions 401, 402. The first 401 of these portions is almost identical to the core of the first embodiment of the invention and is shown in FIGS. 2 to 4. Thus, it comprises recesses 45G, 45D evenly arranged in the zone 48 (see FIG. 2), the zone 48 comprising a left lateral edge 42G, a right lateral edge 42D and a central inner core 44. The left lateral edge 42G and the right lateral edge 42D are connected to the central inner core 44 via the left wing 46G and the right wing 46D, respectively. This first portion of the core differs from the core described with reference to FIGS. 2 to 4 in that a recess 491 is provided at its base. The recess 491 extends longitudinally over the entire length of the zone 48 and transversely over a slightly wider width than the recesses 45G, 45D. The recess 491 receives a plate 49, which constitutes the second portion 402 of the core 4. When the ski is in the position of use, the plate 49 is located under the central inner core 44, the right 46G and left 46D wings and a portion of the lateral edges 42G, 42D.

The plate 49 and the recess 491 have perfectly complementary shapes so that, once positioned, the plate 49 completely closes the recesses 45G, 45D of the zone 48. In other words, the plate 49 is arranged under the first core portion so as to close the recesses. The plate 49 can be made of a material similar to that of the remainder of the core 4, such as PU (polyurethane), or even in a different material, such as PET (polyethylene terephthalate). Insofar as the plate 49 has a constant thickness, it can be prepared by cutting a panel to the desired dimensions.

Advantageously, the presence of the plate 49 prevents any deformation in the area of the recesses 45G, 45D of the lower reinforcement 3 and of the gliding sole 5. Indeed, the risk of the lower reinforcement 3 and the gliding sole 5 sinking slightly due to the recesses 45G, 45D is eliminated. The flatness of the gliding surface of the ski is therefore completely preserved.

Figure 8:
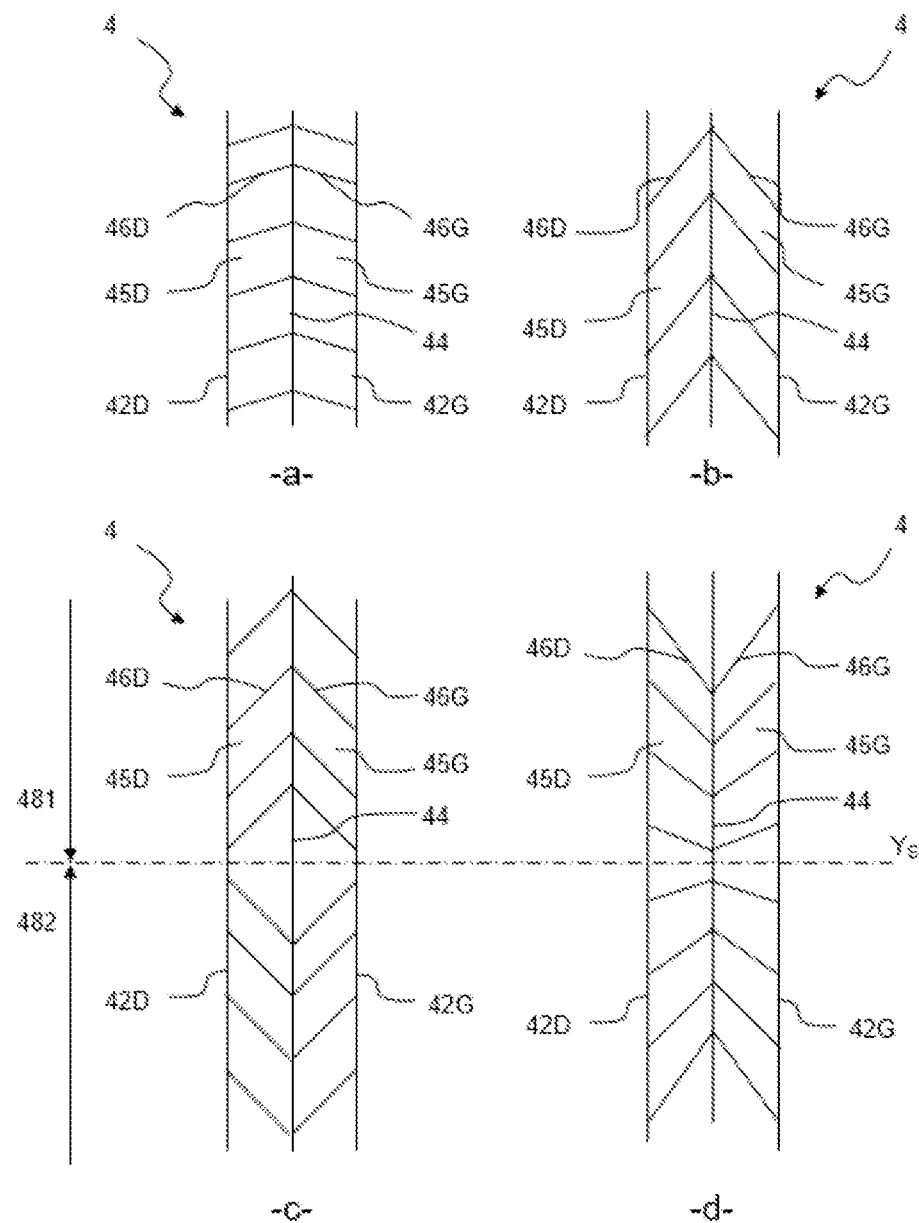
FIG. 8 is a schematic view showing various core configurations according to other embodiments of the invention.

FIG. 8 schematically illustrates other embodiments of the invention. For reasons of simplicity, only the respective axes of the central inner core 44, the left lateral edge 42G, the right lateral edge 42D, and the left 46G and right 46D wings are shown. It should be noted that the cores -a-, -b-, -c- and -d- are similar to the cores previously described with respect to their other characteristics.

The embodiment -a- is a core for which the angle $\beta_{46G}$ formed by the axis of the left wing 46G with the longitudinal axis of the core is relatively substantial, approximately 75°. As a result, the transverse crushing rigidity of the core is increased.

The embodiment -b- is a core for which the angle $\beta_{46G}$ formed by the axis of the left wing 46G with the longitudinal axis of the core is much less, on the order of 40°. This configuration will be preferred if the material selected for injecting the core is very viscous.

The embodiment -c- is a core in which the spacing between the wings is variable. In this case, it increases as one moves away from the central portion, longitudinally speaking. A plurality of distinct configurations of the embodiment -c- can be envisioned. In a first configuration, so-called -c1-, the wings 46G, 46D keep a constant width. Thus, the amplitude of the recesses 45G, 45D increases as one moves away from the center, so that the portions of the core that are away from the center generally have a lower density than those of the center. In a second configuration, so-called -c2-, the width of the wings 46G, 46D increases as one moves away from the center, while the amplitude of the recesses 45G, 45D remains constant over the entire length. Then, the apparent density of the portions of the core that are away from the center is relatively more substantial than the apparent density of the center. All the intermediate configurations between the configurations -c1- and -c2-, for example with a concomitant increase in the thickness of the wings and the amplitude of the recesses, can also be envisioned.

The embodiment -d- is a core in which the angle $\beta_{46G}$, $\beta_{46D}$ formed by the wings 46G, 46D is variable longitudinally. In the front portion 481, the left wings 46G1 form an angle $\beta_{46G1}$ between 5° and 85° with the longitudinal axis, while in the rear portion 482, the angle $\beta_{46G2}$ formed by the left wings 46G2 is between 95° and 175°. In this case, in the rear portion and in the vicinity of the center, the angle is substantially equal to 70° and increases as one moves away from the center. Preferably, the variation of the angle $\beta_{46G}$ is progressive, the angle $\beta_{46G}$ is approximately 35° at its maximum. The right wings 46D1, 461D2 follow a symmetrical pattern of the left wings 46G1, 46G2 with respect to the longitudinal axis of the ski.

Figure 9:
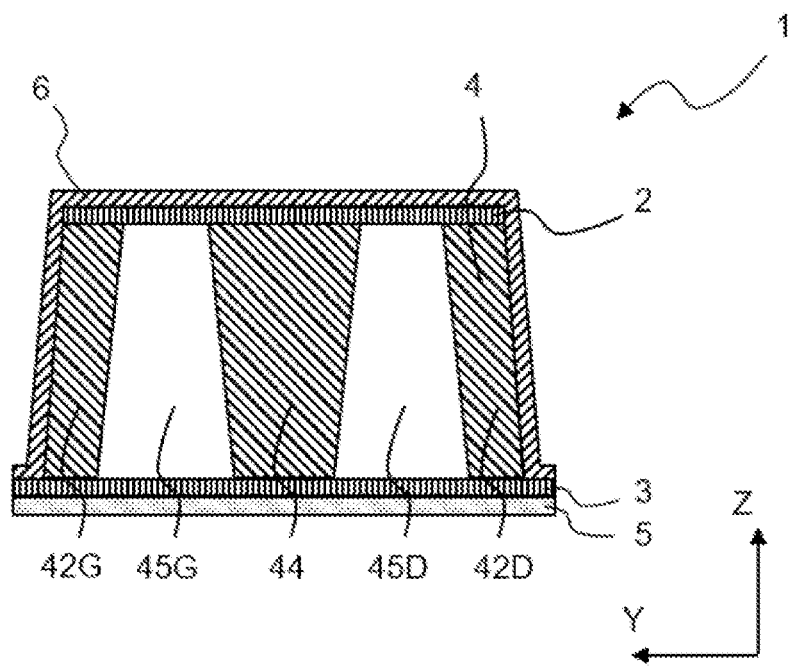
FIG. 9 is a "transverse" cross-sectional view, similar to the cross-section of FIG. 4, of a ski according to a fifth embodiment.
Figure 10:
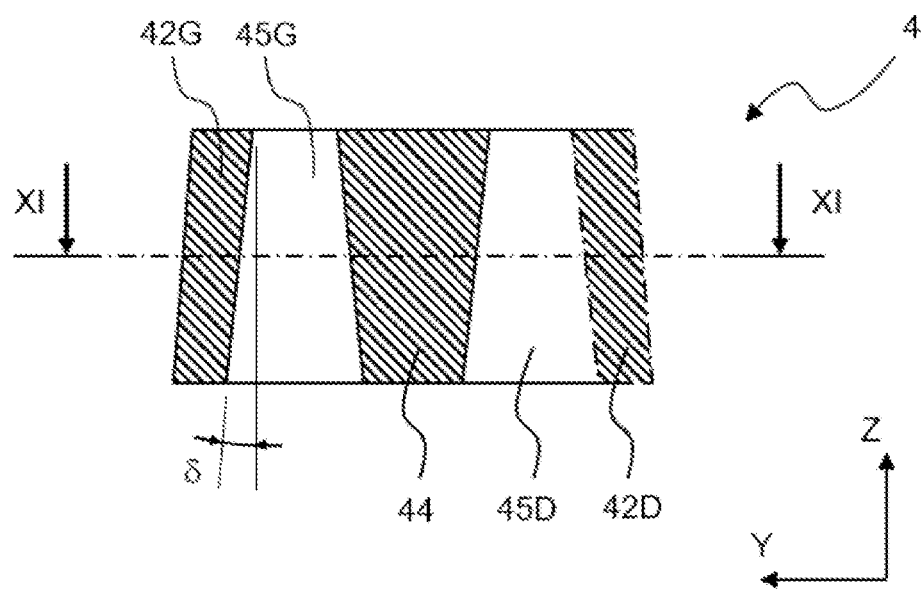
FIG. 10 is a cross-sectional view, similar to the cross-section of FIG. 4, of a core according to the embodiment of FIG. 9.
Figure 11:
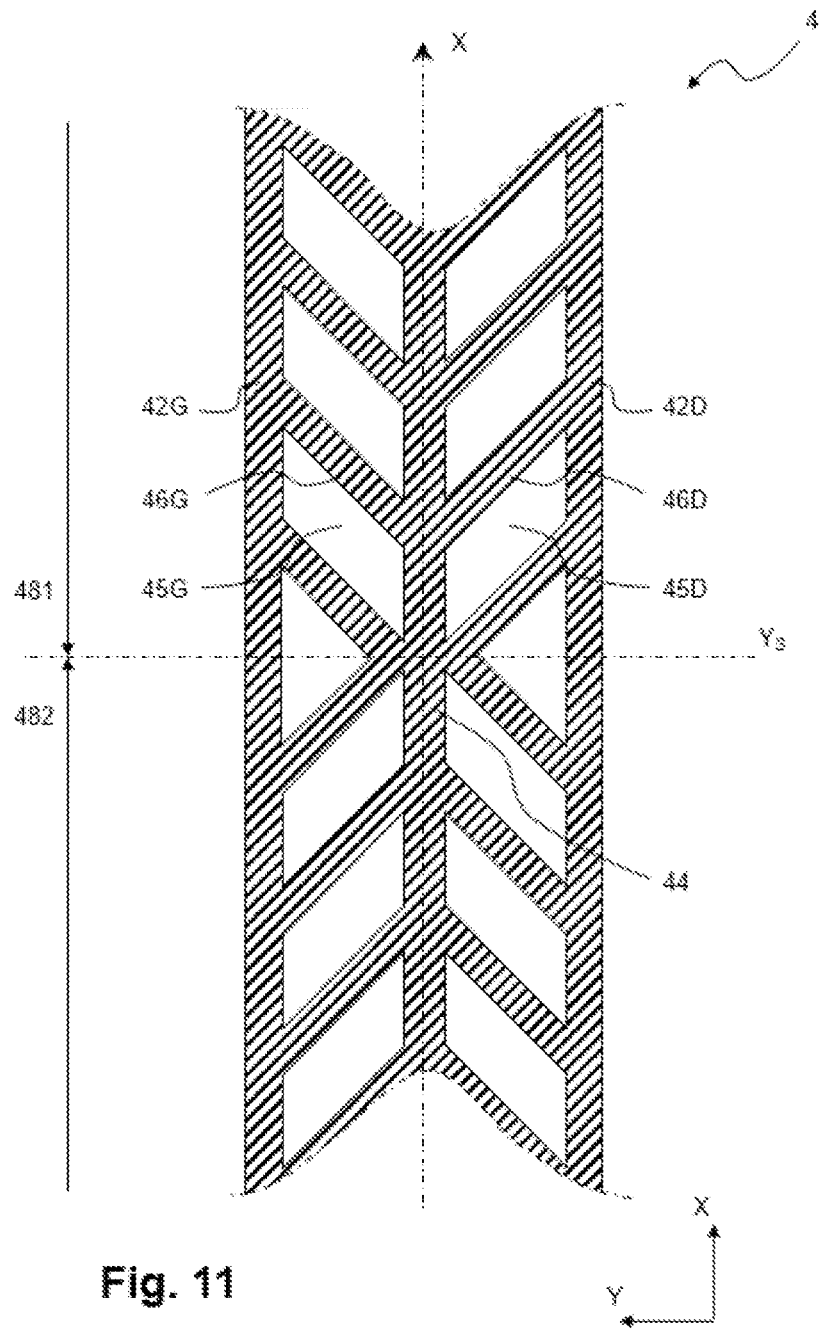
FIG. 11 is a section of the core along the line XI-XI of FIG. 10.

FIGS. 9 to 11 illustrate a fifth embodiment close to the third embodiment of FIG. 6, except that the recesses 45G and 45D are through over the entire height of the core 4. These recesses 45G, 45D are not closed by a portion of the upper plate 41.

As for the third embodiment, the central zone 48, in which the recesses 45G, 45D are located, is divided into a plurality of sections, four of which are visible in FIG. 11. A plurality of recesses 45G or 45D are present in each of these sections, and they are arranged substantially parallel to one another. The particular arrangement of the sections is carried out according to a double symmetry. There is a symmetry along the longitudinal axis "X" and a symmetry along a transverse axis "$Y_S$", which perpendicularly intersects the longitudinal axis "X" in the area of the center of the core. The symmetry along the longitudinal axis results in that the arrangement of the recesses respects a symmetry with respect to the medial plane of the core. This plane is the vertical plane oriented along the longitudinal axis X. The symmetry along the transverse axis $Y_S$ results in that the arrangement of the recesses respects a symmetry with respect to a transverse plane, which is perpendicular to the medial plane.

FIGS. 12 to 15 show transverse sections of cores according to four other embodiments of the invention. For these various embodiments of the invention, only the transverse section will be shown, because the horizontal section XI-XI is identical to that of the fifth embodiment of the invention shown in FIG. 11.

Figure 12:
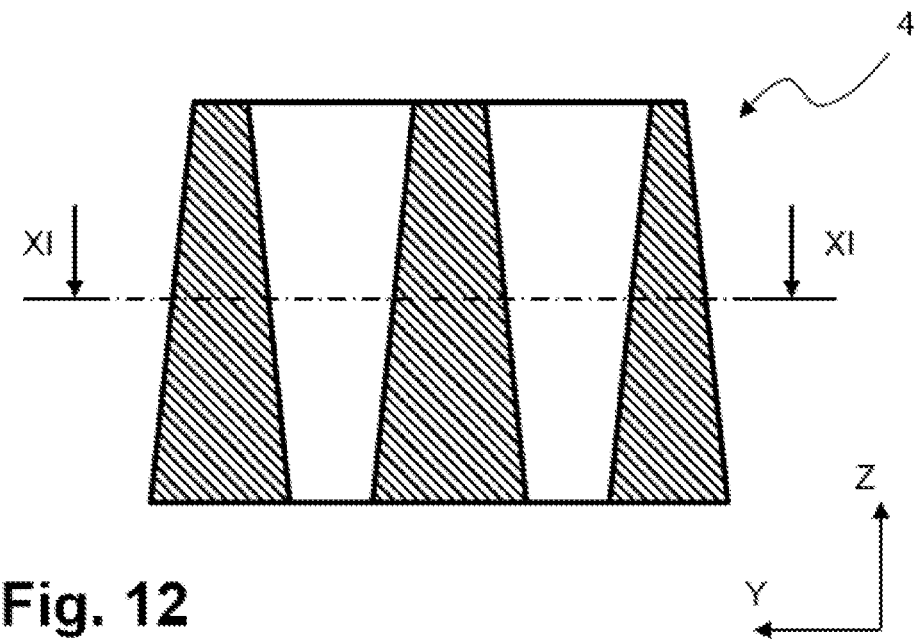
FIG. 12 is a cross-sectional view, similar to the cross-section of FIG. 4, of a core according to a sixth embodiment.

The sixth embodiment shown in FIG. 12 differs from the fifth embodiment by the value of the angle "δ". Indeed, the bases of the recesses are narrower than their top in this configuration.

Figure 13:
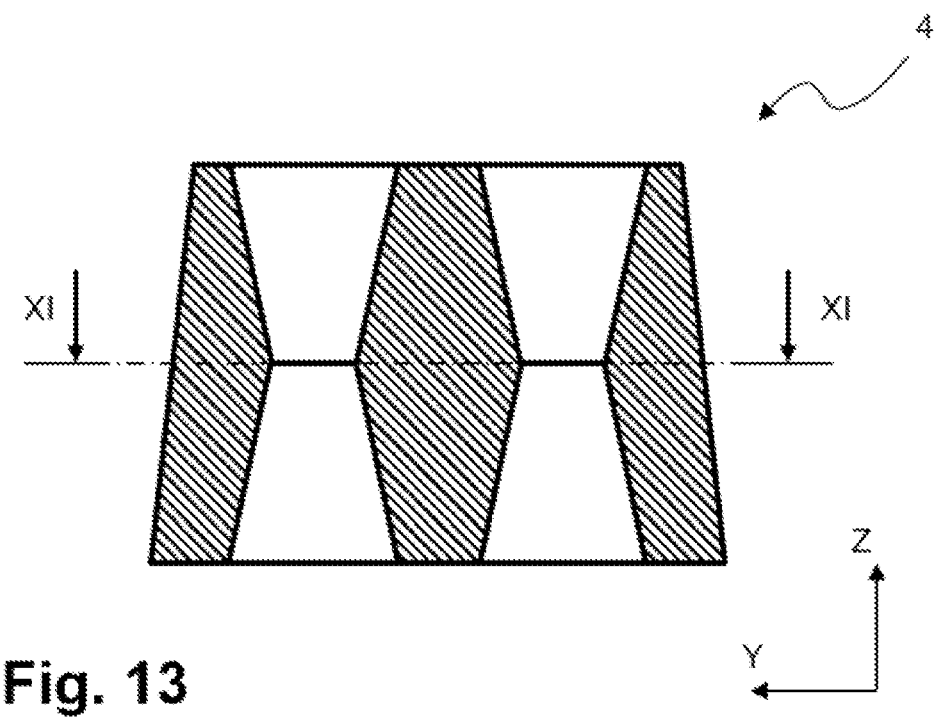
FIG. 13 is a cross-sectional view, similar to the cross-section of FIG. 4, of a core according to a seventh embodiment.

FIG. 13 shows a transverse section of a core according to a seventh embodiment of the invention. The shape of the recesses therein is different from that of the two previous embodiments. Indeed, the upper portion of the recesses is flared upwards, and the lower portion is flared downwards.

Figure 14:
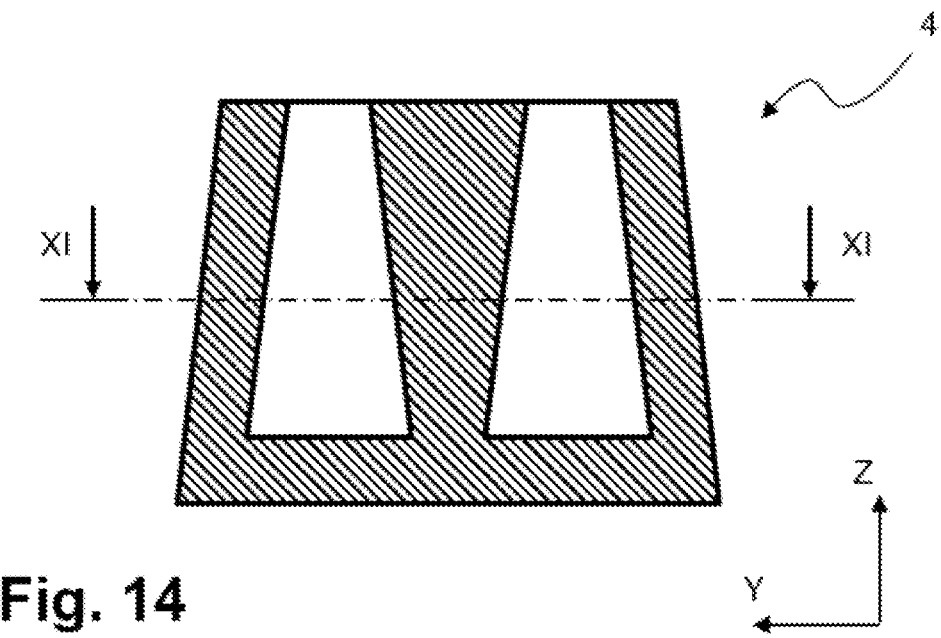
FIG. 14 is a cross-sectional view, similar to the cross-section of FIG. 4, of a core according to an eighth embodiment.

FIG. 14 shows a transverse section of a core according to an eighth embodiment of the invention. Unlike the previous embodiments, the recesses are not through recesses and the lower portion of the core constitutes a plate. Such a configuration makes it possible to avoid hollow deformations of the gliding sole. Indeed, if a core conforming to the configurations of the fifth, sixth and seventh embodiments is used with a lower reinforcement having no sufficient rigidity, or even if the lower portions of the through recesses of these embodiments have overly large circumferences, there is a risk that hollows will form on the gliding sole in view of the recesses.

Figure 15:
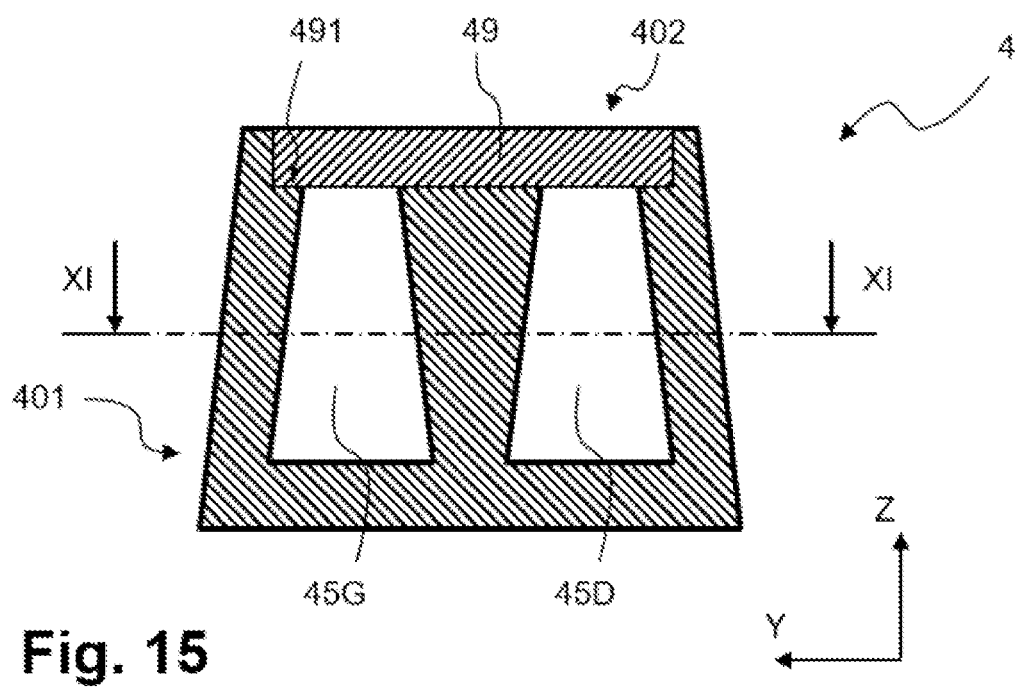
FIG. 15 is a cross-sectional view, similar to the cross-section of FIG. 4, of a core according to a ninth embodiment.

FIG. 15 shows a transverse section of a core according to a ninth embodiment of the invention. The core in this embodiment is comprised of two portions 401, 402. The first 401 of these portions is almost identical to the core of the eighth embodiment of the invention and shown in FIG. 14, and it differs therefrom in that a recess 491 is provided at its upper portion. The recess 491 extends longitudinally over the entire length of the central zone 48 and transversely over a width slightly wider than the recesses 45G, 45D. The recess 491 receives a plate 49, which constitutes the second portion 402 of the core. When the ski is in the position of use, the plate 49 is located on the central inner core 44, the right 46D and left 46G wings and a portion of the lateral edges 42G, 42D.

The plate 49 and the recess 491 have perfectly complementary shapes so that, once positioned, the plate 49 completely closes the recesses 45G, 45D of the zone 48. The plate 49 can be made of a material similar to that of the remainder of the core 4, such as PU (polyurethane), or else of a material such as PET (polyethylene terephthalate). Insofar as the plate 49 has a constant thickness, it can be prepared by cutting a panel to the desired dimensions.

Advantageously, the presence of the plate 49 prevents any deformation of the upper reinforcement 2 and of the top layer 6 in the area of the recesses 45G, 45D. The plate 49 also ensures better anchoring of the ski binding device provided for connecting the boot to the ski.

Figure 16:
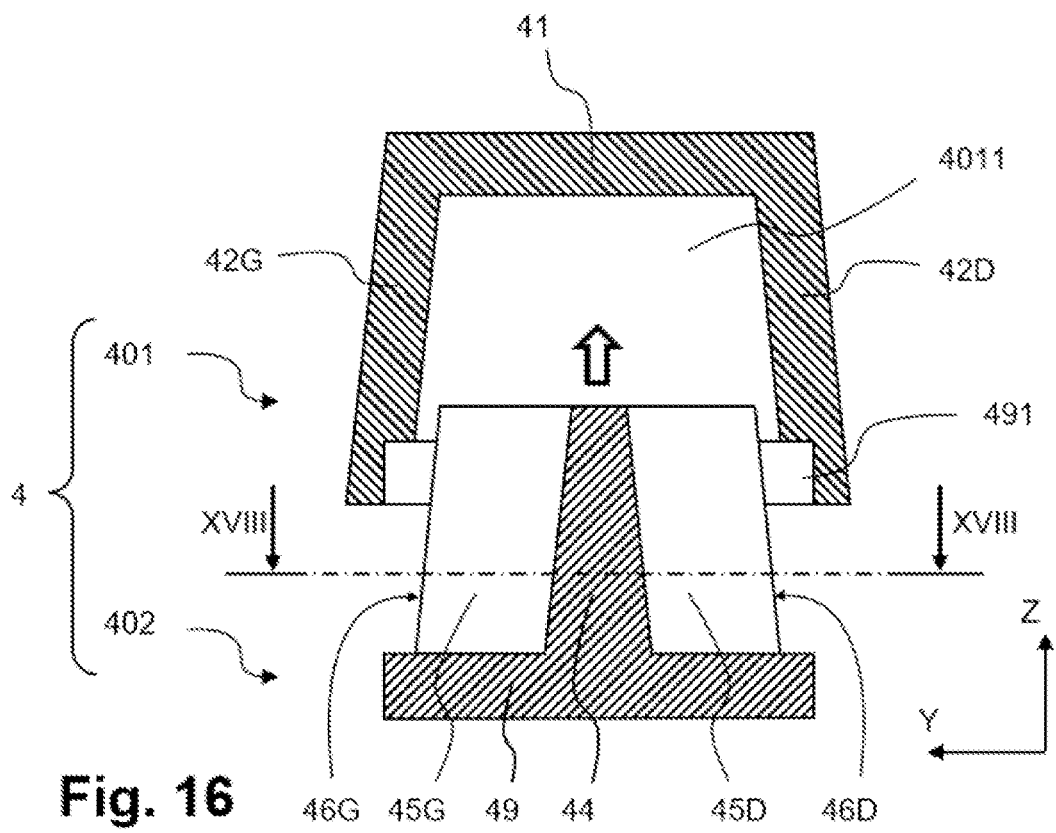
FIG. 16 is a cross-sectional view, similar to the cross-section of FIG. 4, of a core according to a tenth embodiment, before assembly.
Figure 17:
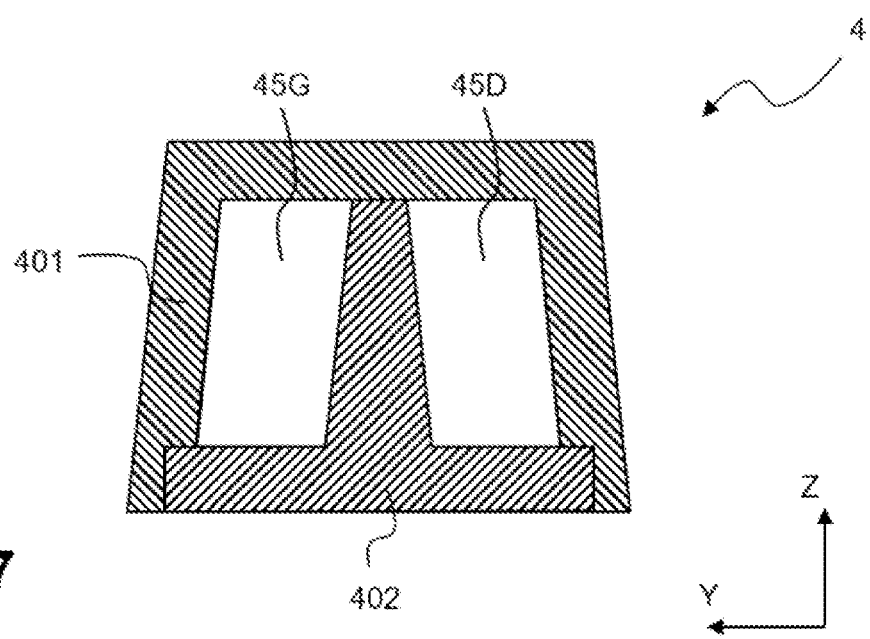
FIG. 17 is a cross-sectional view, similar to the cross-section of FIG. 4, of a core of FIG. 16, after assembly.
Figure 18:
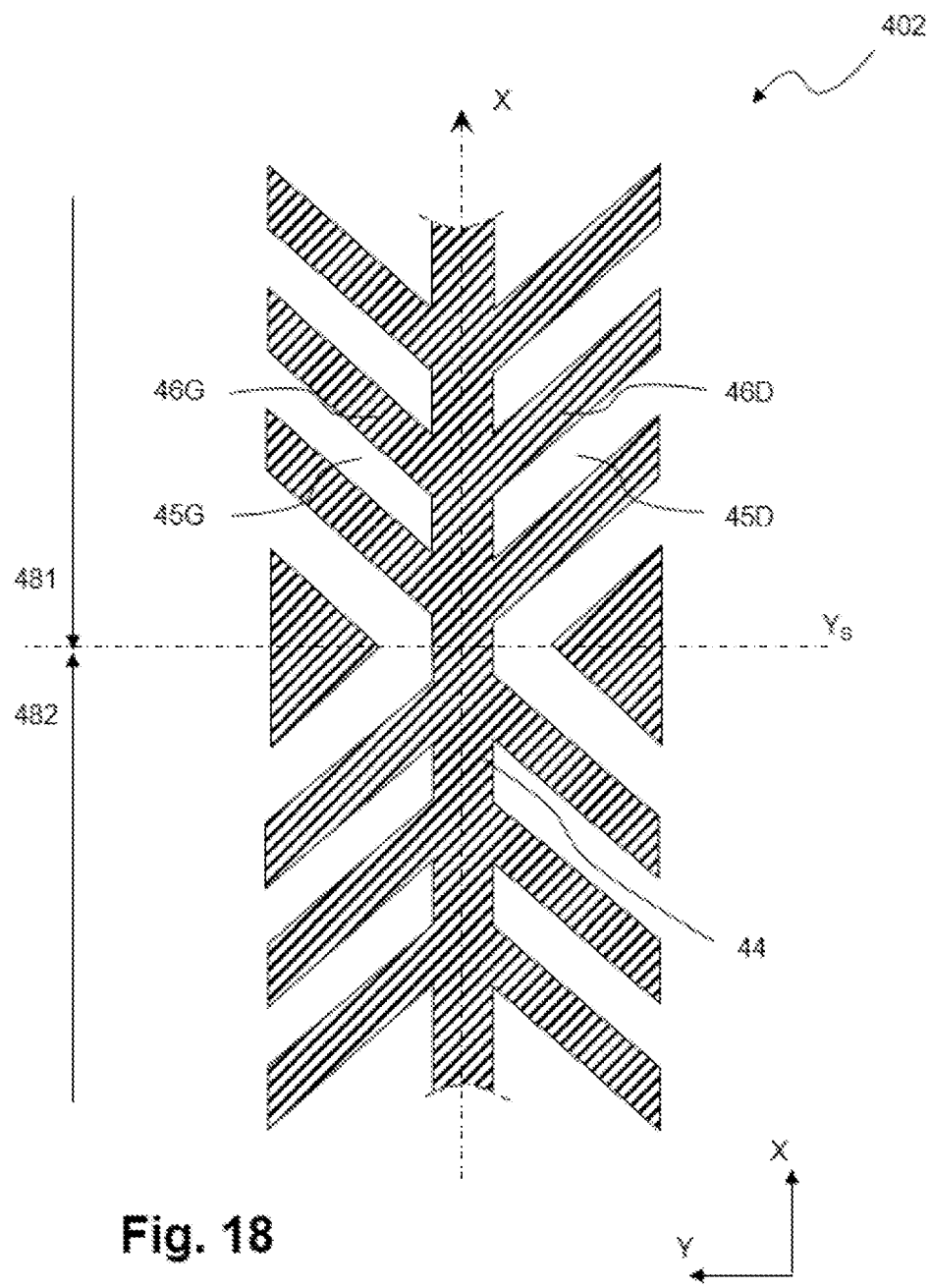
FIG. 18 is a cross-section of the core along the line XVIII-XVIII of FIG. 16.

FIGS. 16 to 18 show a tenth embodiment of the invention which, as does the ninth embodiment, takes up the idea of a core made of two portions, including an upper portion 401 and a lower portion 402. The lower portion 402 is present only in the central zone 48. Within this zone, the upper portion 401 is broken down into an upper plate 41, a left lateral edge 42G and a right lateral edge 42D. These three elements surround a cavity 4011. In the front 4AV and rear 4AR zones of the core, only the upper portion 401 is present and constitutes the entirety of the core.

The lower portion 402 is comprised of a horizontal plate 49 from which a central inner core 44 and a plurality of left 46G and right 46D wings demarcating recesses 45G, 45D project vertically. Similar to the previous embodiments, the central zone of the core is divided into a plurality of sections inside which the left or right wings are arranged in parallel. FIG. 18 illustrates the section of the lower portion of the core along the line XVII-XVII of FIG. 16. In a first sector, the left wings 46G are all oriented along a direction which forms an angle $\beta_{46G}$ with the longitudinal axis X of the ski. Symmetrically, in a second sector, the right wings 46D are all oriented along a direction which forms an angle $\beta_{46D}$ with the longitudinal axis X of the ski, having the same absolute value as the angle $\beta_{46G}$. The angle $\beta_{46G}$, $\beta_{46D}$ must be different from the right angle (90°), or at least not be close thereto. An angle $\beta_{46G}$, $\beta_{46D}$ between 5° and 85° may be selected. Preferably, a value between 30° and 60° is selected. In the tenth embodiment of the invention illustrated here, the angle $\beta_{46G}$, $\beta_{46D}$ is substantially equal to 45°. There is also a symmetrical arrangement of the wings of the second portion 402 of the core with respect to an axis of symmetry $Y_S$ as in the previous embodiments, as seen in FIG. 11.

FIG. 17 shows the core of the tenth embodiment of the invention, once its two constituent portions 401, 402 are assembled to one another. Advantageously, the core thus obtained has a structure which combines excellent rigidity and lightness. Indeed, in the area of the central zone 48, the upper portion 401 and the plate 49 of the lower portion 402 constitute a box that is closed and also supported by the central inner core 44 and the left 46G and the right 46D wings. Furthermore, a plurality of recesses 45G, 45D which lighten the structure are created between the adjacent wings 46G, 46D. Each of the two portions 401, 402 can be made of the same material, for example polyurethane (see the above description associated with the first embodiment of the invention). Advantageously, two different materials can also be selected for the manufacture of the two portions. Injection is a particularly suitable method for producing the two portions, but it is not the only method because any other means of production, such as 3D printing, for example, can be used.

Figure 19:
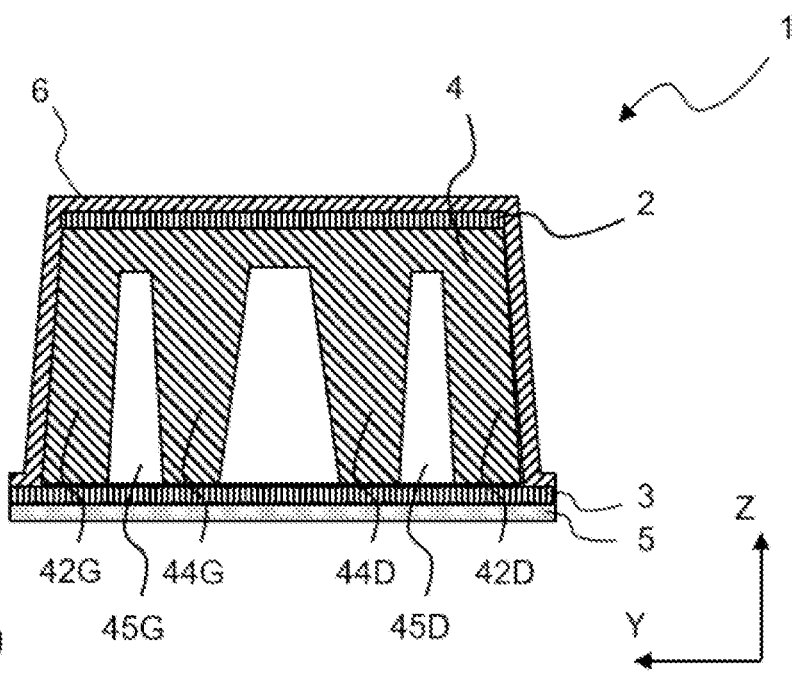
FIG. 19 is a "transverse" cross-sectional view, similar to the cross-section of FIG. 4, of a ski according to an eleventh embodiment.
Figure 20:
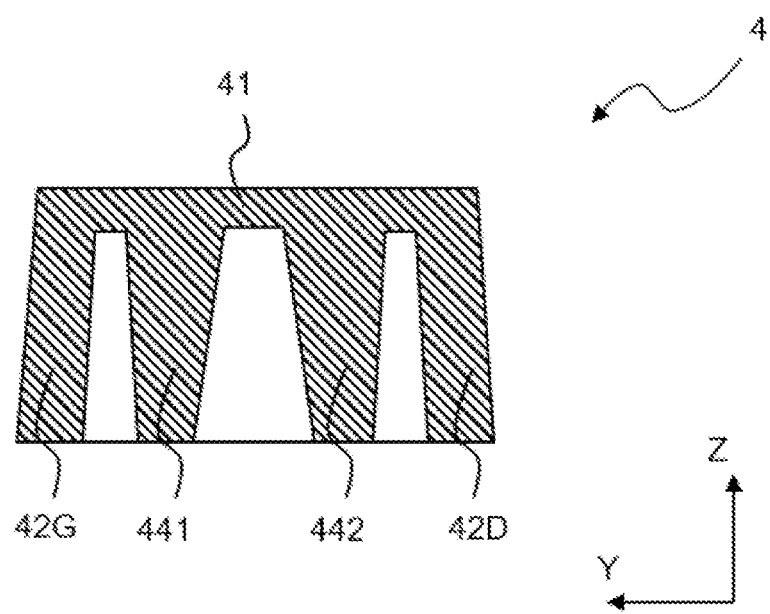
FIG. 20 is a cross-sectional view, similar to the cross-section of FIG. 4, of a core according to the embodiment of FIG. 19.
Figure 21:
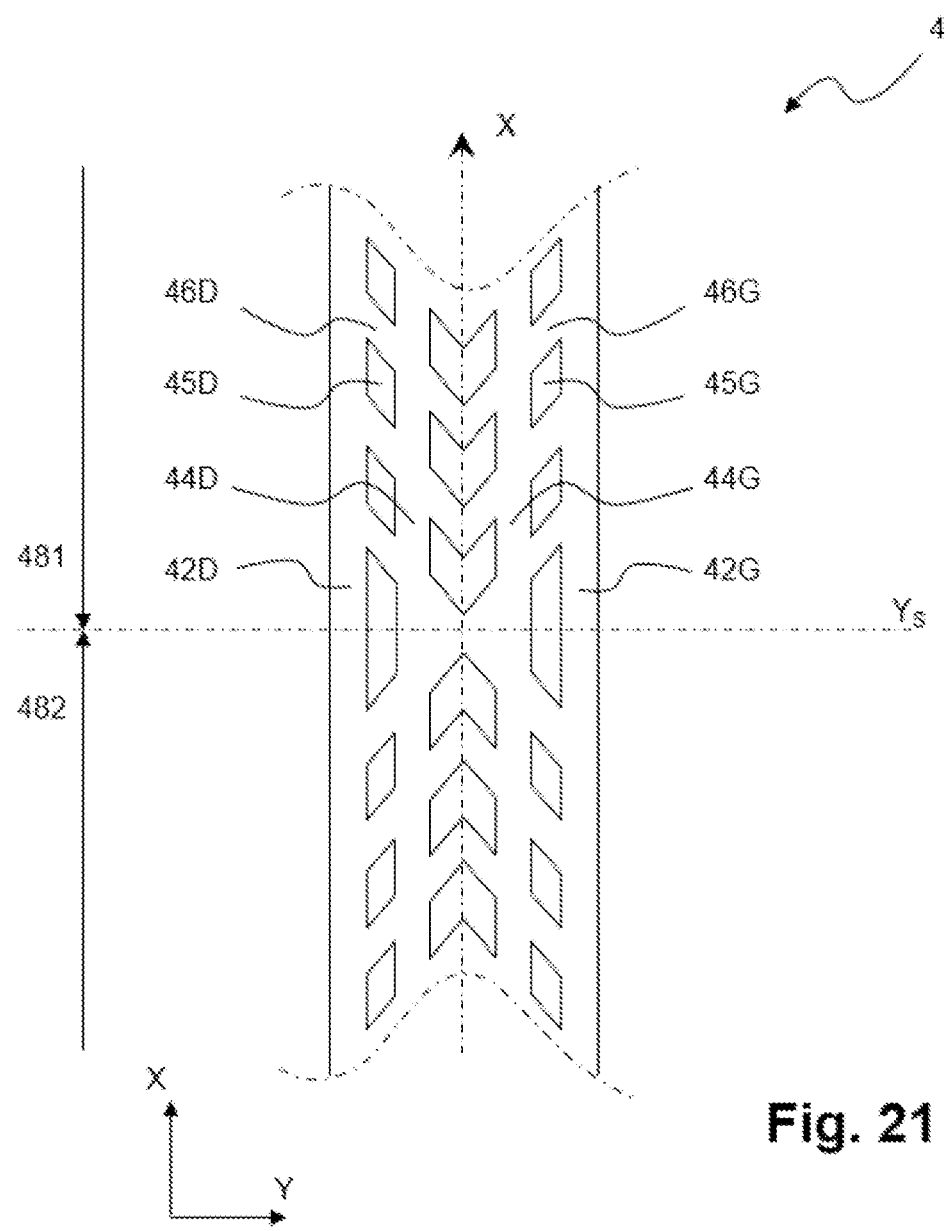
FIG. 21 is a bottom view of the core of FIG. 20.

FIGS. 19 to 21 describe an eleventh embodiment of the invention. FIG. 21 shows a transverse cross-sectional view of the core 4 in the area of the central zone 48. As in some of the previous embodiments, the core comprises a left lateral edge 42G, a right lateral edge 42D, and an upper plate 41. However, it comprises two central inner cores 44G and 44D, and not just one as do all the previous embodiments. FIG. 21, which illustrates a partial bottom view of the central zone 48, shows how the recesses 45G, 45D are arranged parallel to one another in each of the sections which form the zone 48. FIG. 19 shows a transverse cross-section of a ski equipped with such a core.

Whatever the embodiment according to the invention, the core always comprises:
- a plurality of left wings 46G arranged between at least one central inner core 44, 44G and the left lateral edge 42G, each left wing forming an angle between 5° and 85° or between 95° and 175° with the longitudinal axis X of the ski,
- a plurality of right wings 46D arranged between at least one central inner core 44, 44D and the right lateral edge 42D, each right wing forming an angle between 5° and 85° or between 950 and 175° with the longitudinal axis X of the ski,
- a plurality of left interstitial spaces, referred to as left recesses 45G, each left interstitial space being defined between two left wings, the left lateral edge and at least one central inner core, and
- a plurality of right interstitial spaces, referred to as right recesses 45D, each right interstitial space being defined between two right wings, the right lateral edge and at least one central inner core.

Irrespective of the configuration selected, the particular geometry of the cores designed according to the invention makes it possible to optimize the manufacture of a ski. Indeed, the core not only is lightweight, but also guarantees excellent rigidity. Furthermore, it may be easier to produce by injection. The many recesses lighten the core, and the wings act as structural ribs that prevent the lateral edges from coming closer to the central inner core. During injection manufacture of the core, the inclination of the wings facilitates the flow of the material, and thus the uniform filling up of the mold.

The invention is not limited to the several embodiments described above by way of example but aims to protect any equivalent configuration. It is thus possible to combine these embodiments.

The invention is not limited to the embodiments previously described but extends to all the embodiments covered by the appended claims.

Further, at least because the invention is disclosed herein in a manner that enables one to make and use it, by virtue of the disclosure of particular exemplary embodiments of the invention, the invention can be practiced in the absence of any additional element or additional structure that is not specifically disclosed herein.

REFERENCES

1—Ski
2—Upper reinforcement
3—Lower reinforcement
4—Core
401—First portion (upper)
402—Second portion (lower)
41—Upper plate
42G—Left lateral edge
42D—Right lateral edge
44—Central inner core
44G—Left central inner core
44D—Right central inner core
45G—Left recess
45D—Right recess
46G—Left wing
46D—Right wing
48—Central zone
481—Front portion
482—Rear portion
49—Plate
491—Recess
5—Gliding sole
6—Top layer

The invention claimed is:

1. Ski comprising a core comprising:
a left lateral edge;
a right lateral edge; and
at least one central inner core positioned between the left and right lateral edges, said lateral edges and said at least one central inner core extending along a longitudinal axis substantially parallel to the longitudinal axis X of the ski;
the core further comprising:
a plurality of left wings arranged between at least one central inner core and the left lateral edge, each left wing forming an angle between 5° and 85° or between 95° and 175° with the longitudinal axis X;
a plurality of right wings arranged between at least one central inner core and the right lateral edge, each right wing forming an angle between 5° and 85° or between 95° and 175° with the longitudinal axis X.

2. Ski according to claim 1, wherein:
the ski, in its thickness, is comprised of five successive elements starting from the ground, namely, a gliding sole, a lower reinforcement, the core, an upper reinforcement and a top layer, at least the left and right lateral edges extending over an entire height of the core.

3. Ski according to claim 1, wherein:
a height of the core is always at least equal to 50% of a height of the ski in a recessed zone of the core.

4. Ski according to claim 1, wherein:
the core comprises a horizontal upper plate, the left lateral edge and the right lateral edge both extending downwards from the left and right lateral edges, respectively, of the upper plate.

5. Ski according to claim 1, wherein:
the core comprises a plurality of recesses, each recess being demarcated by two adjacent wings, each recess being blind or extending through an entire height of the core.

6. Ski according to claim 1, wherein:
the core is comprised of two components assembled to one another, one of the components carrying the left and right lateral edges.

7. Ski according to claim 6, wherein:
one of the components of the core is a plate closing the recesses.

8. Ski according to claim 7, wherein:
the plate carries the central inner core(s) and/or the wings.

9. Ski according to claim 1, wherein:
the left wings and the right wings are arranged symmetrically with respect to the longitudinal axis X of the ski.

10. Ski according to claim 1, wherein:
in a front portion of the core, the left wings form an angle between 5° and 85° with the longitudinal axis X of the ski, and the right wings form an angle between 95° and 175° with the longitudinal axis X of the ski; and
in a rear portion of the core, the left wings form an angle between 95° and 175° with the longitudinal axis X of the ski, and the right wings form an angle between 5° and 85° with the longitudinal axis X of the ski, or vice versa.

11. Ski according to claim 1, wherein:
the core is made by injection.

12. Ski according to claim 1, wherein:
the wings are arranged so that their width is substantially equal to a space separating two adjacent wings.

13. Ski according to claim 1, wherein:
a respective base of the left lateral edge, right-side edge, central inner core, left wings and right wings, has a respective width that is substantially equal and between two and eight millimeters.

14. Ski according to claim 1, wherein:
the left wings and the right wings, respectively, of the core do not all form a same angle with the longitudinal axis X of the ski.

15. Ski according to claim 1, wherein:
the core comprises two central inner cores.

* * * * *